(12) United States Patent
Bezek et al.

(10) Patent No.: US 8,663,758 B2
(45) Date of Patent: Mar. 4, 2014

(54) PARTIALLY METALLIZED FILM HAVING BARRIER PROPERTIES

(75) Inventors: Edward Anthony Bezek, Frisco, TX (US); Anthony Robert Knoerzer, Parker, TX (US); Steven Kenneth Tucker, Hurst, TX (US)

(73) Assignee: Frito-Lay North America, Inc., Plano, TX (US)

( * ) Notice: Subject to any disclaimer, the term of this patent is extended or adjusted under 35 U.S.C. 154(b) by 853 days.

(21) Appl. No.: 12/207,010

(22) Filed: Sep. 9, 2008

(65) Prior Publication Data

US 2010/0062196 A1 Mar. 11, 2010

(51) Int. Cl.
*B32B 1/04* (2006.01)
*B32B 7/02* (2006.01)

(52) U.S. Cl.
USPC .......................................... 428/35.2; 428/212

(58) Field of Classification Search
USPC ............. 428/35.2; 118/720; 427/248.1–255.7
See application file for complete search history.

(56) References Cited

U.S. PATENT DOCUMENTS

| | | | |
|---|---|---|---|
| 3,311,486 A * | 3/1967 | Scharf | 427/251 |
| 5,055,343 A * | 10/1991 | Murphy | 428/209 |
| 5,530,231 A | 6/1996 | Walters et al. | |
| 6,106,627 A | 8/2000 | Yializis | |
| 7,136,580 B2 * | 11/2006 | Ueyama et al. | 396/6 |
| 2001/0032440 A1 | 10/2001 | Weder | |
| 2006/0035066 A1 | 2/2006 | Souparis | |
| 2008/0175986 A1 * | 7/2008 | Crouse et al. | 427/154 |

FOREIGN PATENT DOCUMENTS

| | | |
|---|---|---|
| EP | 2522593 A1 | 11/2012 |
| JP | 57177029 | 10/1982 |
| JP | 61147869 | 12/1984 |
| JP | 03043233 | 2/1991 |
| JP | 04104188 | 4/1992 |
| JP | 07117158 A | 5/1995 |
| JP | 2004338771 A | 12/2004 |
| JP | 2007139539 A | 6/2007 |

OTHER PUBLICATIONS

English machine translation of JP7117158 to Izumi.*

* cited by examiner

*Primary Examiner* — Ellen S Raudenbush
*Assistant Examiner* — Yan Lan
(74) *Attorney, Agent, or Firm* — James R. Gourley; Colin P. Cahoon; Carstens & Cahoon, LLP

(57) ABSTRACT

A partially metallized packaging film and method of making is disclosed. In one aspect, at least one portion of a vaporized metal stream is shielded from contacting a sheet of packaging film during the metallization process. The shield is a rigid plate and can be shaped to provide a sharp transition from transparent film to opaque film, or it can provide a gradual transition from transparent film to opaque film. The partially metallized packaging film can be used with a form, fill and seal machine or other packaging machine to create a food package with a product viewing window. In one aspect, the barrier web comprises a bio-based film.

5 Claims, 12 Drawing Sheets

PARTIALLY METALLIZED FILM HAVING BARRIER PROPERTIES

BACKGROUND OF THE INVENTION

1. Technical Field

The present invention relates to customizable, metallized, flexible packaging material that can be used to balance product visibility with barrier protection in packaged food products and a method of making the customized packaging material.

2. Description of Related Art

Multi-layered flexible film structures made from polymers are often used in flexible packages where there is a need for its advantageous barrier, sealant, and graphics-capability properties. Barrier properties in one or more layers are important in order to protect the product inside the package from light, oxygen or moisture. Such a need exists, for example, for the protection of foodstuffs, which may run the risk of flavor loss, staling, or spoilage if insufficient barrier properties are present to prevent transmission of such things as light, oxygen, or moisture into the package.

In addition, barrier properties also prevent undesirable leaching of the product to the outside of the bag. For example, oily foods such as potato chips have the potential for some oil to leach out into the film of the bag. The sealant properties are important in order to enable the flexible package to form an airtight or hermetic seal. Without a hermetic seal, any barrier properties provided by the film are ineffective against oxygen, moisture, or aroma transmission between the product in the package and the outside.

A graphics capability is needed because it enables a consumer to quickly identify the product that he or she is seeking to purchase, allows food product manufacturers a way to label the nutritional content of the packaged food, and enables pricing information, such as bar codes to be placed on the product. At the same time, consumers also desire to actually view some products, such as potato chips or tortilla chips, through the packaging film in order generally inspect the food products' physical condition and ensure that most of the product has not been broken into small pieces during transport and handling.

One prior art packaging film used for packaging potato chips and like products is metallized film. Metallized film is typically a polymer film, such as oriented polypropylene (OPP) or polyethylene terephthalate (PET), coated with a thin layer of metal. The thin layer of metal is typically applied using a physical vapor deposition process whereby the metal used for the coating is vaporized and deposited onto a sheet of polymer film, all under vacuum conditions. Prior art metallized film has a shiny, opaque appearance and excellent barrier properties against moisture and oxygen transmission.

FIG. 1 depicts a simplified representation of a prior art apparatus for creating metallized film. Inside a vacuum chamber 100, unmetallized polymer film 202 is disposed on a first roll 208 on one side of the vacuum chamber 100. The unmetallized film 202 is unrolled from the first roll 208, travels through a vapor deposition apparatus 206 where it becomes metallized film 204. As stated previously, the vaporized metal 200 is deposited onto one surface of the film. During the process, the film is continuously unrolled from the first roll 208 and rolled onto a second roll 210 disposed on the side of the vapor deposition apparatus 206 opposite the first roll 208. At the conclusion of the process, the second roll 210 will contain a roll of metallized film 204, while the first roll will be empty.

While metallized film provides food packagers with a relatively inexpensive barrier layer, as mentioned previously, the barrier is opaque. This property can be problematic when used for packages of breakable foodstuffs, such as potato chips or tortilla chips. When shopping for such breakable foodstuffs, some consumers may want to view the contents of the food package before actually purchasing the food package to make sure its contents have not been broken to an undesirable degree. Even for non-breakable foodstuffs, consumers may still want to inspect the contents of a food package before deciding whether to purchase it. Particularly colorful or delicious looking foods may even entice a consumer to purchase them if viewed by the consumer. It would be desirable, therefore, to provide a metallized food packaging film with a viewing window through which the contents of the food package can be viewed.

As described in U.S. Pat. No. 5,530,231, a pattern of oil can be deposited on the polymer film before the vaporized metal is deposited on the film to prevent the deposition of metal on the film in the areas masked by the oil. This masking oil pattern can then be washed off to reveal unmetallized portions of the film underneath. This method suffers from several disadvantages, including substantial increases in processing time and capital expense. Furthermore, this method does not provide any way to control the degree of metallization that occurs on different portions of the film. In other words, a particular portion of film metallized using this method will be either fully metallized or completely unmetallized.

A need exists, therefore, to finely control the degree of metallization over the entire surface of the film, and to do so economically.

SUMMARY OF THE INVENTION

The present invention is directed towards a metallized packaging film having variable barrier properties. In one aspect, the packaging film of the present invention is partially metallized such that when the film is used on a form-fill-seal packaging machine, a clear product window is provided to the consumer. In another aspect of one embodiment, the packaging film gradually transitions from at least one opaque, metallized area to at least one transparent, non-metallized area. In another embodiment, the product viewing window is not transparent, but is translucent. In still another aspect of the invention, the metallized and non-metallized areas are provided such that product logos and graphics are not obscured. The present invention thereby provides a partially metallized packaging film with barrier properties that approximate fully metallized packaging films. The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

One embodiment of the present invention is directed towards an apparatus and a method of making a partially metallized packaging film that can be used on a vertical form, fill and seal machine to create a product package with a viewing window. As used herein, the terms "fully metallized packaging film" or "metallized film" mean a polymer film with at least one surface that has been coated with a thin metal layer using a vapor deposition process or similar process known in the art. The most common metal used to coat metallized film is aluminum, but other metals such as nickel or chromium can also be used. The typical thickness of the metal layer on metallized film is approximately 0.5 microns. Metallized PET film can provide about 30 times the moisture barrier and about 400 times the oxygen barrier of a non-metallized PET film. Other metallized polymer films provide similar gains in barrier properties. Metallized film also provides its barrier properties at a unit cost far below the unit cost for clear films that provide similar barrier properties.

Metallized films are virtually opaque to visible light and UV light. While this property may be desirable from a product preservation perspective, it may not be desirable from a consumer perspective depending on the types of foodstuffs inside the package.

Figure 1:
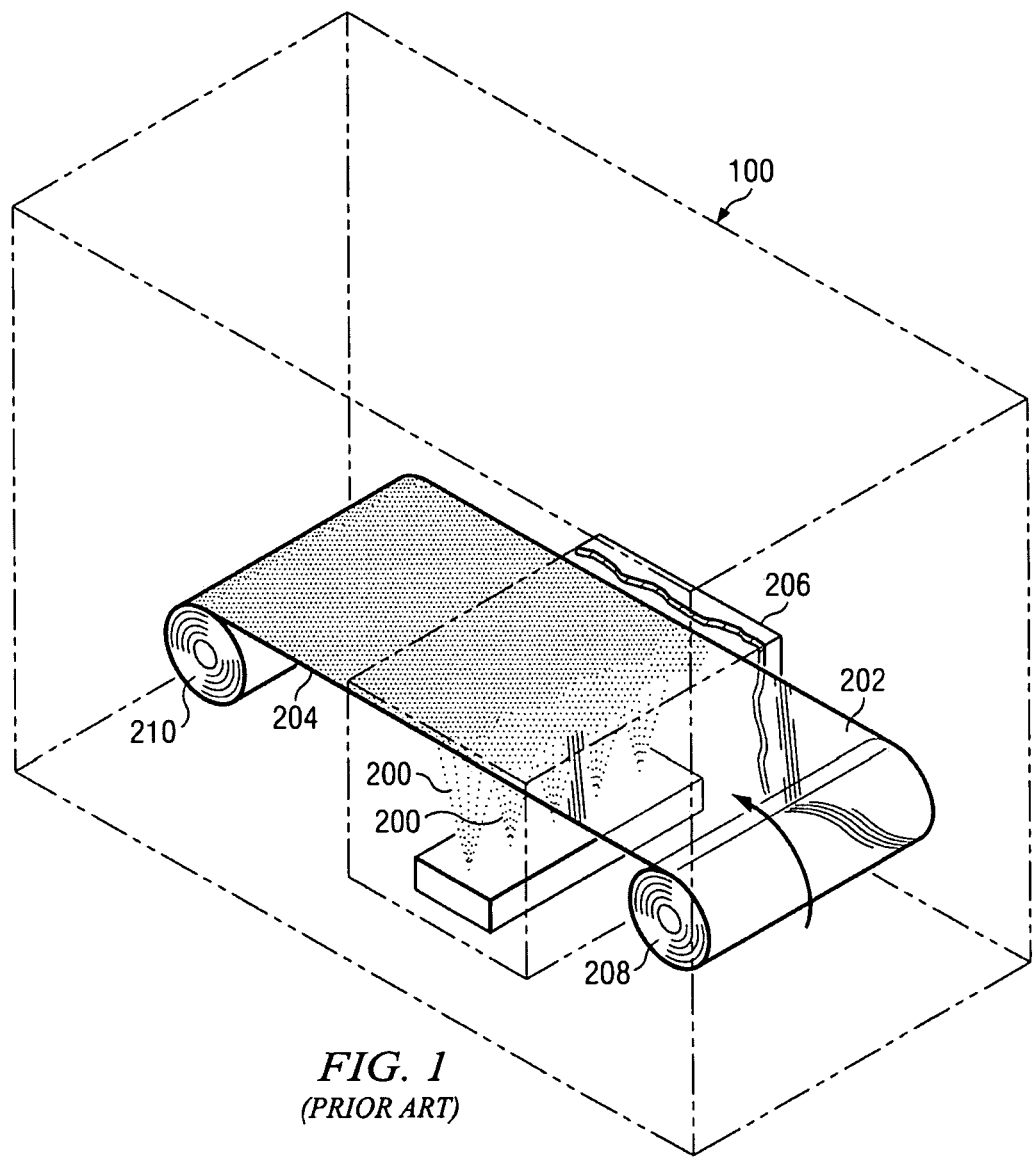
FIG. 1 depicts a perspective view of a prior art apparatus used to make metallized polymer film.
Figure 2:
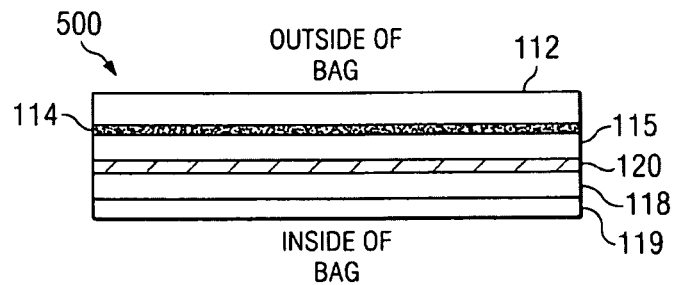
FIG. 2 is a cross-sectional view of prior art multi-layered packaging film.

One prior art multi-layer or composite metallized film used for packaging foodstuffs and like products is illustrated in FIG. 2 which is a schematic of a cross section of a multi-layer film 500 illustrating each individual substantive layer. Each of these layers functions in some way to provide the needed barrier, sealant, and graphics capability properties. For example, the graphics layer 114 is typically used for the presentation of graphics that can be reverse-printed and viewed through a transparent outer base layer 112. Like numerals are used throughout this description to describe similar or identical parts, unless otherwise indicated. The outer base layer 112 is typically oriented polypropylene ("OPP") or polyethylene terephthalate ("PET"). A metal layer 120, as described above, is disposed upon an inner base layer 118 to provide barrier properties. A sealant layer 119 disposed upon the inner base layer 118 enables a hermetic seal to be formed at a temperature lower than the melt temperature of the inner base layer. A lower melting point sealant layer 119 is desirable because melting a metallized OPP to form a seal could have an adverse effect on the barrier properties. Typical prior art sealant layers 119 include an ethylene-propylene co-polymer and an ethylene-propylene-butene-1 ter-polymer. A glue or laminate layer 115, typically a polyethylene extrusion, is required to adhere the outer base layer 112 with the inner, product-side base layer 118. Thus, at least two base layers of polymer film are typically required in a composite or multi-layered film.

Figure 3:
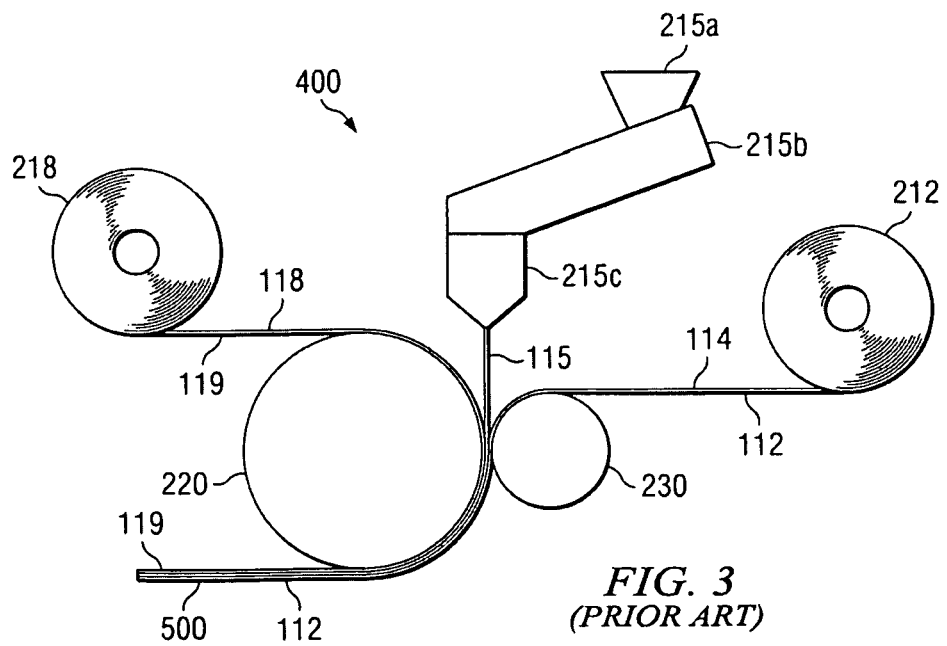
FIG. 3 depicts a schematic view of a prior art apparatus used to make multi-layered packaging film.

FIG. 3 demonstrates schematically the formation of material, in which the outer base layer 112 and metallized inner base layer 118 of the packaging material are separately manufactured, then formed into the final material 500 on an extrusion laminator 400. The outer base layer 112 having graphics 114 previously applied by a known graphics application method such as flexographic or rotogravure is fed from roll 212 while metallized inner base layer 118 is fed from roll 218. At the same time, resin for the laminate layer 115 is fed into hopper 215a and through extruder 215b, where it will be heated and extruded at die 215c as molten polymer laminate 115. This molten polymer laminate 115 is extruded at a rate that is congruent with the rate at which the base layer materials 112, 118 are fed, becoming sandwiched between these two layers. The layered material 500 then runs between chill drum 220 and nip roller 230, ensuring that it forms an even layer as it is cooled. The pressure between the laminator rollers is generally in the range of 0.5 to 5 pounds per linear inch across the width of the material. The large chill drum 220 is made of stainless steel and is cooled to about 50-60° F., so that while the material is cooled quickly, no condensation is allowed to form. The smaller nip roller 230 is generally formed of rubber or other resilient material. Note that the layered material 500 remains in contact with the chill drum 220 for a period of time after it has passed through the rollers, to allow time for the resin to cool sufficiently. The material can then be wound into rolls (not specifically shown) for transport to the location where it will be used in packaging.

Figure 4:
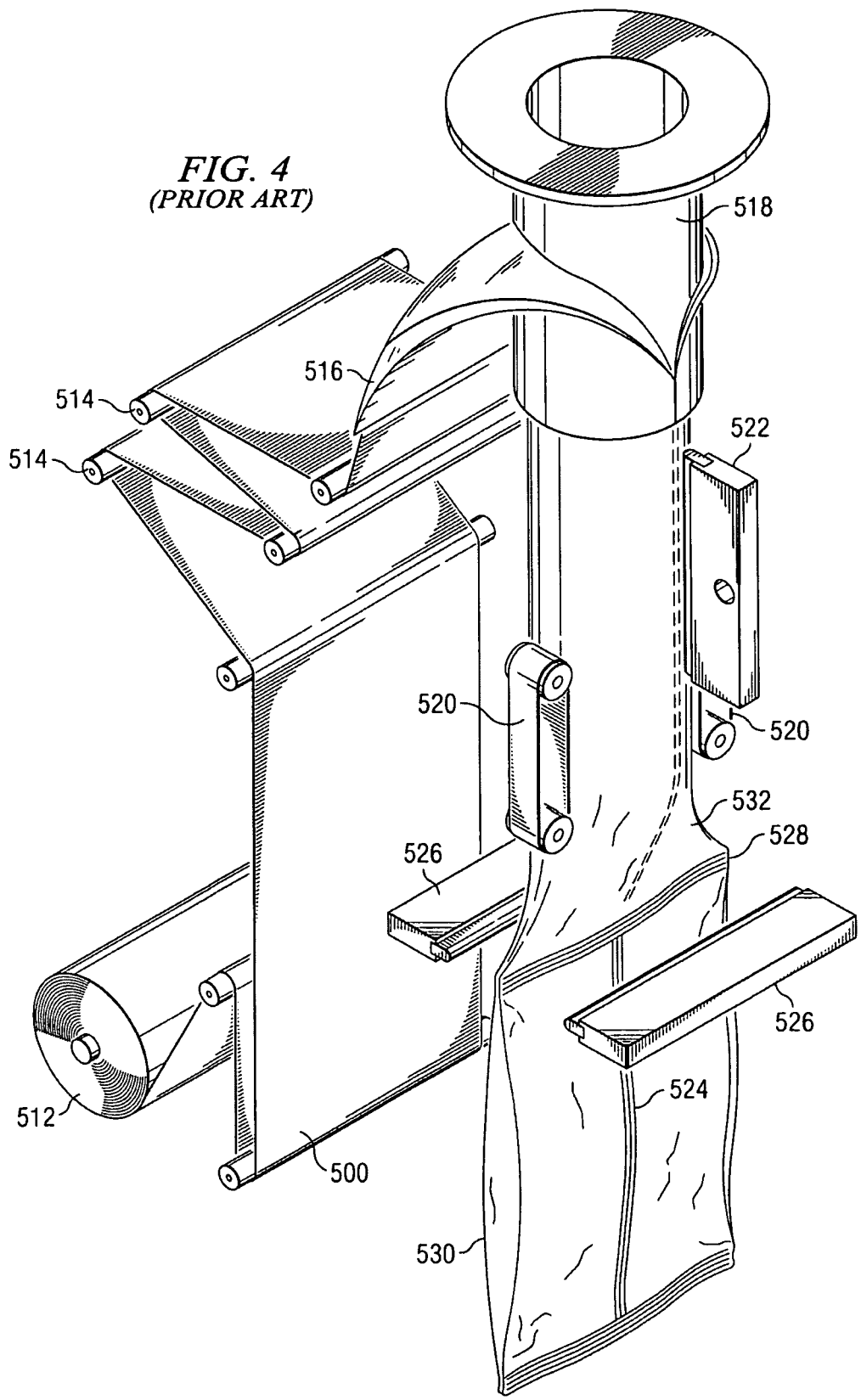
FIG. 4 depicts a vertical form, fill, and seal machine that is known in the prior art.

Once the material is formed and cut into desired widths, it can be loaded into a vertical form, fill, and seal machine to be used in packaging the many products that are packaged using this method. FIG. 4 shows an exemplary vertical form, fill, and seal machine that can be used to package snack foods, such as snack chips. This drawing is simplified, and does not show the cabinet and support structures that typically surround such a machine, but it demonstrates the general workings of the machine. Packaging film 500 is taken from a roll 512 of film and passed through tensioners 514 that keep it taut. The film then passes over a former 516, which directs the film as it forms a vertical tube around a product delivery cylinder 518. This product delivery cylinder 518 normally has either a round or a somewhat oval cross-section. As the tube of packaging material is pulled downward by drive belts 520, the edges of the film are sealed along its length by a vertical sealer 522, forming a back seal 524. The machine then applies a pair of heat-sealing jaws 526 against the tube to form a transverse seal 528. This transverse seal 528 acts as the top seal on the bag 530 below the sealing jaws 526 and the bottom seal on the bag 532 being filled and formed above the jaws 526. After the transverse seal 528 has been formed, a cut is made across the sealed area to separate the finished bag 530 below the seal 528 from the partially completed bag 532 above the seal. The film tube is then pushed downward to draw out another package length. Before the sealing jaws form each transverse seal, the product to be packaged is metered through the product delivery cylinder 518 and is held within the tube above the transverse seal 528.

The present invention is thus directed towards a method for making a partially metallized packaging film base layer, and the packaging film itself, that can be used in conjunction with a co-extrusion machine to create a multi-layered partially metallized packaging film which in turn can be used with a vertical form, fill and seal machine to create a metallized product package with a product viewing window. In one embodiment, at least one metallized target shape in the form of a logo or graphic can be included on the packaging film.

Figure 5:
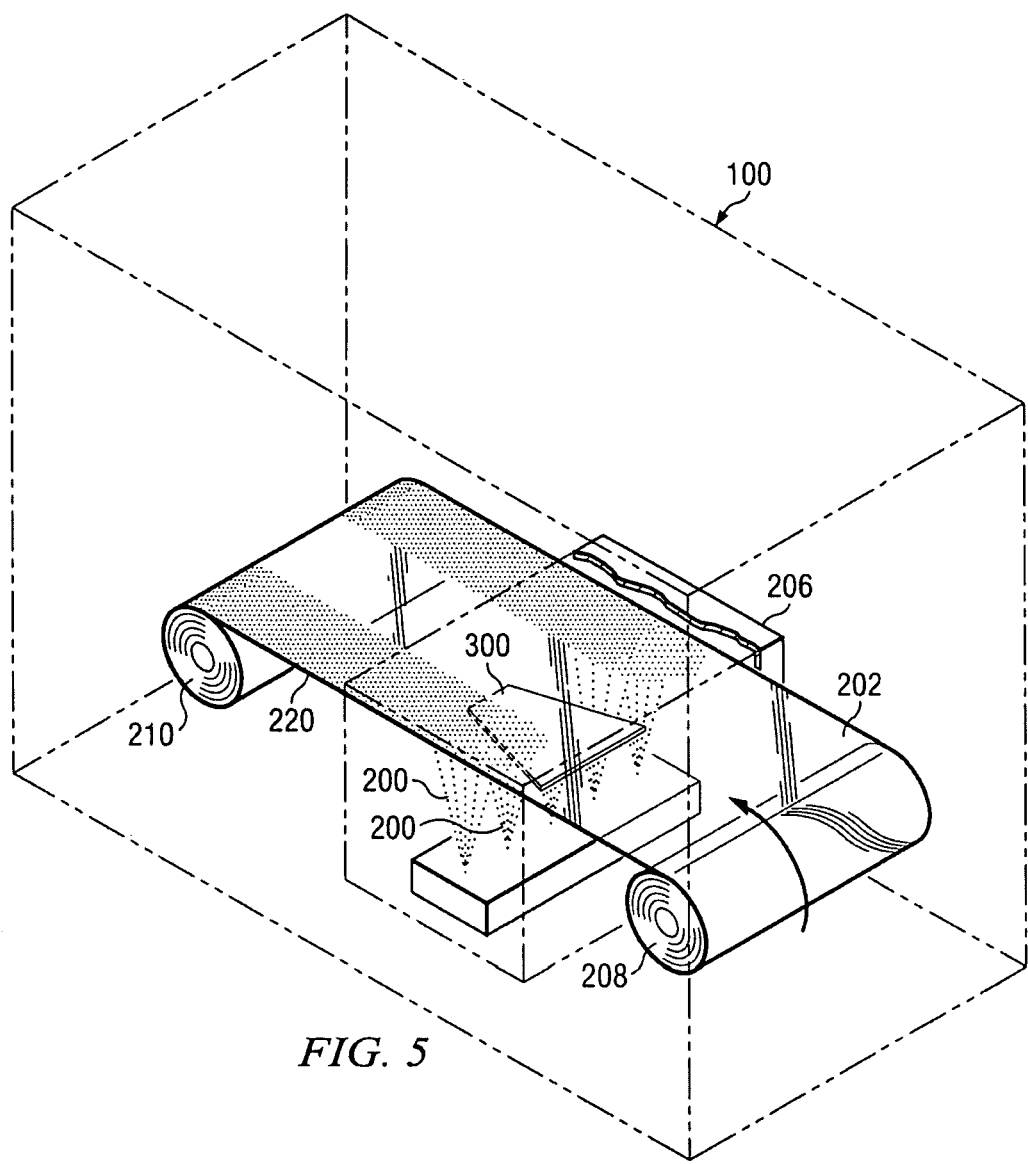
FIG. 5 depicts an apparatus used to make the partially metallized film of the present invention.

As used herein, the term "partially metallized packaging film" means a polymer film with at least one surface that has at least one area fully coated with a thin metal layer and at least one area that is either not coated with a thin metal layer or that is partially coated with a thin metal layer. FIG. 5 is a representative depiction of one embodiment of the apparatus of the present invention used to create the partially metallized film of the present invention. As shown therein, inside a vacuum chamber 100, unmetallized polymer film 202 is disposed on a first roll 208 on one side of the vacuum chamber 100. The unmetallized film 202 is unrolled from the first roll 208, travels through a vapor deposition apparatus 206 where it becomes partially metallized. Inside the vapor deposition apparatus 206, the vaporized metal stream 200 is sprayed towards one surface of the film. A vapor shield 300 is disposed between the vaporized metal stream 200 and the surface of the film to be metallized. The vapor shield 300 blocks at least one portion of the vaporized metal stream 200 from reaching the film surface, thereby leaving at least one area of the film unmetallized or partially metallized. During the process, the film is continuously unrolled from the first roll 208 and rolled onto a second roll 210 disposed on the side of the vapor deposition apparatus 206 opposite the first roll 208. At the conclusion of the process, the second roll 210 will contain a roll of partially metallized film 220, while the first roll will be empty.

Figure 6:
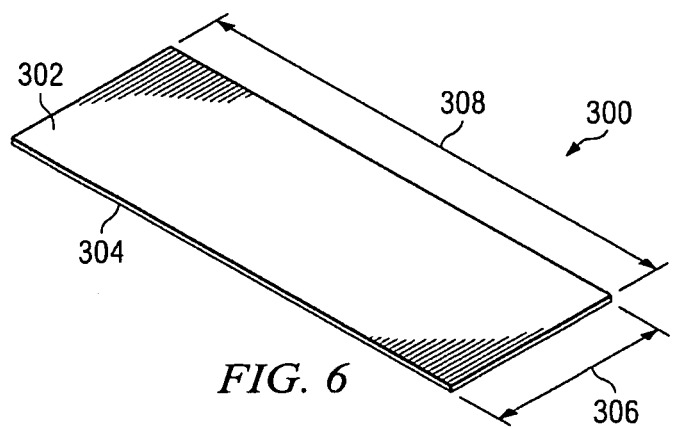
FIG. 6 depicts one embodiment of the vapor shield of the present invention.

FIG. 6 depicts one embodiment of the vapor shield 300 of the present invention. In this embodiment, the vapor shield of the present invention is a single plate comprising a top surface 302 and a bottom surface 204, a width 306, a length 308, and a thickness. As depicted in FIG. 5 (although the specific shield depicted therein is the embodiment of FIG. 9), during the metallization process the shield 300 is disposed in an approximately co-planar arrangement with the film being metallized, but without touching or contacting the film. The shield is also arranged such that the length 308 of the shield is approximately parallel to the film's direction of travel and the width 306 of the shield is parallel to the width of the film sheet. The embodiment depicted in FIG. 5 is simplified and does not depict the support structures which would dispose the shield inside the metallization apparatus in a coplanar relationship with the film sheet. Such support structures would be known to one skilled in the art.

The shield embodiment depicted in FIG. 6 is the most basic embodiment of the present invention. It has a constant width 306 throughout its length 308, and its length 308 is long enough to shield the entire portion of film behind the shield 300 from being metallized inside the metallization apparatus 206.

Figure 7:
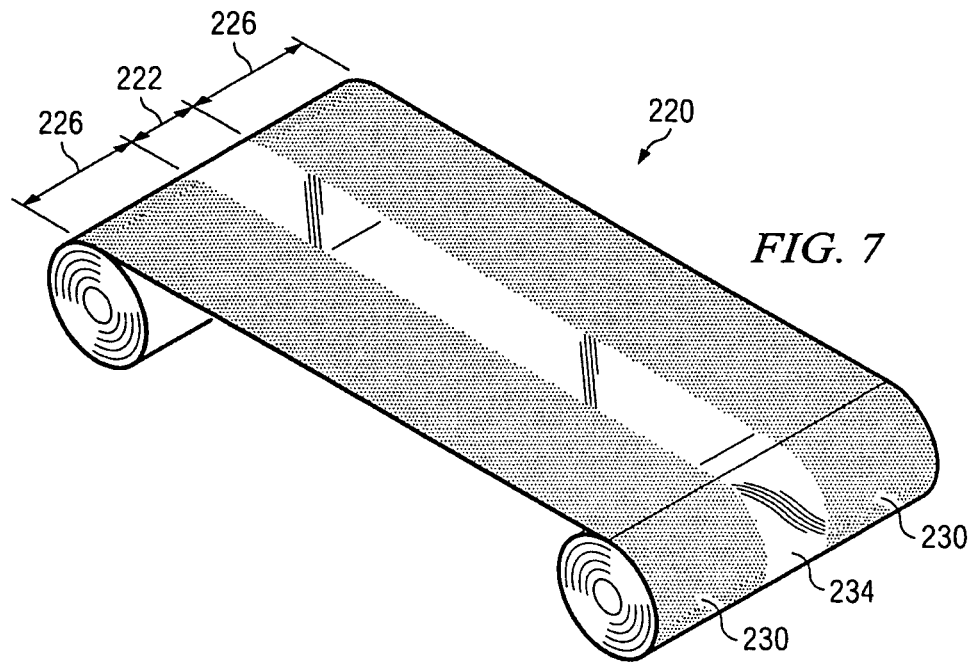
FIG. 7 depicts one embodiment of the partially metallized film of the present invention.
Figure 8:
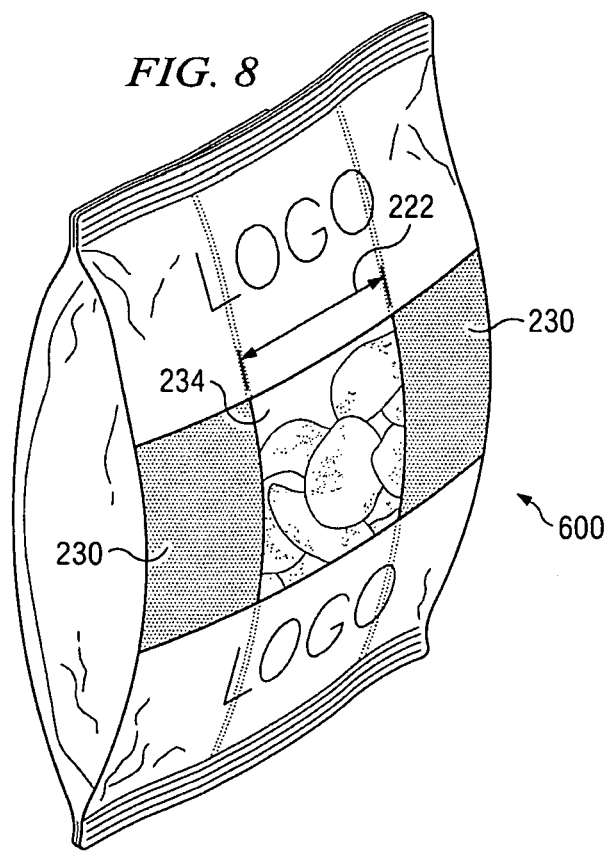
FIG. 8 depicts one embodiment of the food product of the present invention having a transparent product viewing window.

FIG. 7 depicts a perspective view of a partially metallized film 220 created using the shield embodiment of FIG. 6. When initially transparent polymer film 202 is used with this embodiment of the shield 300, the resulting partially metallized film 220 comprises a strip of transparent film 234 (or fully unmetallized film) disposed between two strips of opaque film 230 (or fully metallized film). This embodiment is not a preferred embodiment because the transition from the transparent film strip 234 to the opaque film strips 230 in this embodiment is a sharp one. The sharp transition is not preferred because, ultimately, the partially metallized film 220 will be combined with an outer base layer that has graphics and/or logos printed on it. When the sharp transition from opaque to transparent film is present in the partially metallized film layer 220, a distinct line corresponding to the transition can be discerned through the graphics layer, especially where light pigments are used in the graphics layer. Therefore, some graphics can be obscured or made less attractive due to the presence of this distinct line. An example of a product bag 600 with a distinct line is shown in FIG. 8. The preferred embodiments described below overcome this problem by providing a gradual transition from opaque to transparent film. The gradual transition region is less distinct, if not completely invisible, through most graphics and logo prints.

Figure 9:
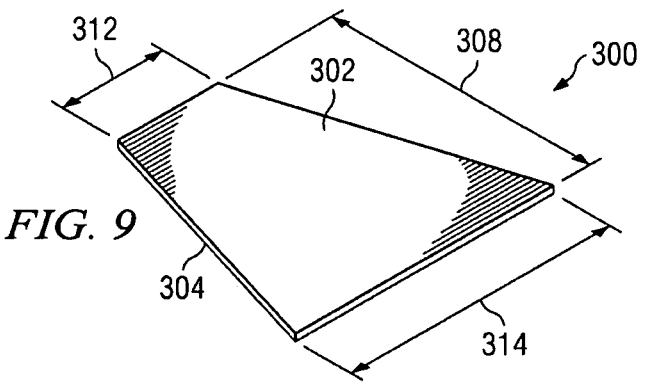
FIG. 9 depicts one embodiment of the vapor shield of the present invention.
Figure 10:
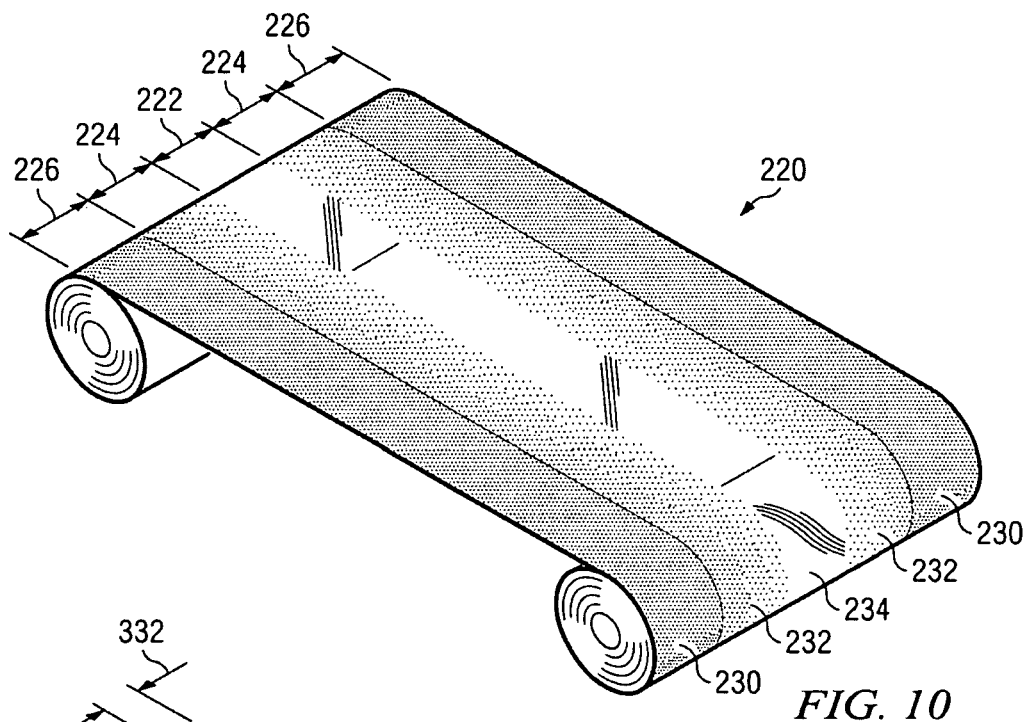
FIG. 10 depicts one embodiment of the partially metallized film of the present invention.

FIG. 9 depicts another embodiment of the vapor shield of the present invention. The FIG. 9 embodiment is shown in use in FIG. 5. FIG. 10 depicts a perspective view of a partially metallized film sheet made using the shield embodiment of FIG. 9. As can be seen therein, it comprises a transparent strip 234, which is bordered on both sides by a translucent strip 232, each of which are bordered by an opaque strip 230. In this embodiment, as depicted in FIG. 9, the shield comprises a single plate with a top surface 302, a bottom surface 304, a length 308, major width 314 and a minor width 312. The major width is found at one end of the plate and the minor width is found at the opposite end. The resulting cross section of the plate when viewed looking directly at the top or bottom surface 302, 304 is that of an isosceles trapezoid, with the transition between the major and minor widths being approximately linear. In one embodiment, the length 308 of the vapor shield is such that when an initially transparent polymer film sheet undergoes metallization, it has the following characteristics, as depicted in FIG. 10: (a) one strip of the film sheet having a width 222 approximately equal to the minor width 312 of the shield receives no vaporized metal, and as such is a transparent film strip 234; (b) two strips of the film sheet, one on either side of the transparent film strip 234, each of which, having reduced exposure time to the vaporized metal stream 200, is partially metallized, and thereby a translucent strip 232, with each translucent strip 232 having a width 224 approximately equal to half the difference between the shield's major width 314 and minor width 312, an inner edge adjacent to said transparent film strip 234, and an outer edge opposite said transparent film strip 234; and (c) two strips of the film sheet that are fully metallized, or opaque film strips 230, with an liner edge adjacent to said translucent film strip 232, an outer edge coterminous with one edge of said film sheet and a width 226 equal to the distance between said inner and outer edges.

It will be appreciated by one skilled in the art, in view of the teachings herein, that the shield can be disposed relative to the film sheet such that the transparent, translucent, and opaque film strips can be located at different places laterally along the width of the film sheet. For example, in one embodiment, the shield can be disposed with one edge coterminous with an edge of the film sheet. In this embodiment, either a translucent film strip or a transparent film strip will comprise one edge adjacent to the film strip edge. Different embodiments of the shield can be used in this way to provide a variety of different partially metallized packaging films. All embodiments of the partially metallized film sheets produced by this invention, regardless of where the particular strips are located, will comprise at least one opaque film strip, and at least one of a transparent film strip or a translucent film strip.

Referring back to FIG. 10, the degree of metallization of the translucent film strip 232 gradually varies from almost fully unmetallized at its inner edge to almost fully metallized at its outer edge. Thus, the transition from the opaque film strip 230 to the transparent film strip 234 is a gradual transition. This gradual transition from opaque to transparent is one of the novel features of the partially metallized film of the present invention. The opaque strips of the film 230 provide excellent oxygen and moisture barrier properties.

The term opaque, as used herein, means a degree of transmittance of less than about 5% of incident visible light. In other words, an opaque film 230 allows less than about 5% of incident visible light pass through. The translucent strips 232 provide improved oxygen and moisture barrier properties. The term translucent, as used herein to describe a particular polymer based film, means a degree of transmittance between about 5% and the degree of transmittance for that particular film in its non-metallized condition. In other words, a translucent film allows more than about 5% of incident visible light to pass through, but less than the percentage of visible light that would pass through the same particular film in its non-metallized condition. The transparent strip of film 234 provides the same barrier properties as the unmetallized polymer film. The term transparent, as used herein to describe a particular polymer based film, means the degree of transmittance of incident visible light for that particular film when it is in a completely non-metallized condition. In other words, a transparent film is a film that allows approximately as much incident visible light to pass through it as that particular film would in a completely non-metallized condition. The term "degree of transmittance" as used herein, when used to describe a film, means the percentage of incident visible light allowed to pass through the film. When a food package is made utilizing the partially metallized film of this embodiment of present invention, it has excellent barrier properties, along with a transparent product viewing window.

In the embodiment of the shield depicted in FIG. 9, the widths of the transparent strip 234, the translucent strips 232, and the opaque strips 230, as well as the degree of gradation of the translucent strips 232, can all be controlled by varying the major 314 and minor 312 widths of the shield. The width of the transparent strip 222 is approximately equal to the minor width 312 of the shield. When the shield 300 is symmetrical around its lengthwise axis, the width of each translucent strip 224 is approximately equal to half the difference between the major 314 and minor 312 widths of the shield. Furthermore, the rate of change in the degree of transmittance across the width of each translucent strip 224 can be controlled by controlling the difference between the major 314 and minor 312 widths of the shield 300. The greater the difference between the major and minor widths of the shield, the more gradual the transition from the opaque strip to the transparent strip. However, in this embodiment, the degree of control a practitioner has over the transition region is restricted to some extent in that the amount of metal deposited onto the translucent film strip varies approximately linearly across its width due to the trapezoidal shape of the shield plate. The width of each opaque strip 226 is approximately equal to the distance between an outer edge of each translucent strip 232 and the edge of the film sheet closest in proximity to said outer edge of said translucent strip 232.

In another embodiment of the shield depicted in FIG. 9, the major width 314 of the shield is made greater than or equal to the width of the film sheet. In this embodiment, no opaque strips 230 are formed during the metallization process. A transparent strip 222 will be formed, again with a width approximately equal to the minor width 312 of the shield. Two translucent strips 232 will be formed on opposite sides of said transparent strip 222. In this embodiment, the width of each translucent strip 224 is equal to the distance between one edge of the transparent strip 222 and the edge of the film sheet 220 closest in proximity to said transparent strip 222 edge. The degree of transmittance will gradually vary from almost transparent at the translucent strip edge adjacent to said transparent strip, to almost opaque at the edge of the film sheet.

Figure 11:
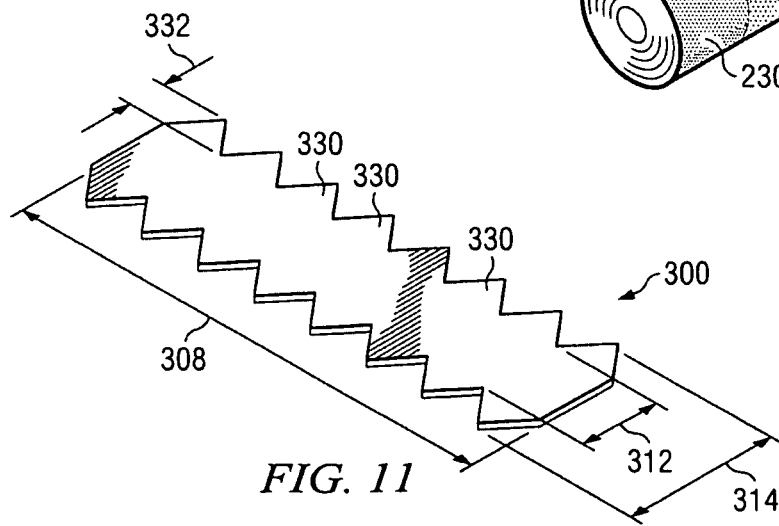
FIG. 11 depicts one embodiment of the vapor shield of the present invention.
Figure 12:
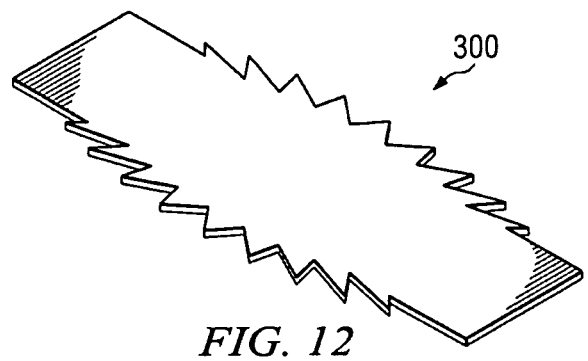
FIG. 12 depicts one embodiment of the vapor shield of the present invention.

In FIG. 11 is depicted another embodiment of the vapor shield of the present invention. In this embodiment, the vapor shield comprises a single plate with a length, a major width and a minor width. The plate in this embodiment has a plurality of saw teeth 330 along its length. Preferably, in one embodiment all of the saw teeth 330 protrude from the plate to approximately equal distances. In another embodiment, depicted in FIG. 12, the saw teeth protrude from the plate at varying distances. In one embodiment, referring back to FIG. 11, the major width of the shield comprises the distance from the tips of the saw teeth on one side of the shield to the tips of the saw teeth on the opposite side of the shield, the minor width of the shield comprises the distance from the base of the saw teeth on one side of the shield to the base of the saw teeth on the opposite side of the shield, and the transition between its major and minor widths is a saw tooth transition. As with the embodiment depicted in FIG. 9, a film sheet metallized behind this shield will be similar to the film strip depicted in FIG. 10, and will comprise a transparent strip 234, two graduated translucent strips 232, and two opaque strips 230. The width of the translucent strip 224 is approximately equal to the height of the saw teeth 332. Higher saw teeth also provide a more gradual transition from transparent to opaque. In this embodiment, the degree of metallization in the translucent strip again varies approximately linearly across its width due to the linear shape of the saw tooth edges.

Figure 13A:
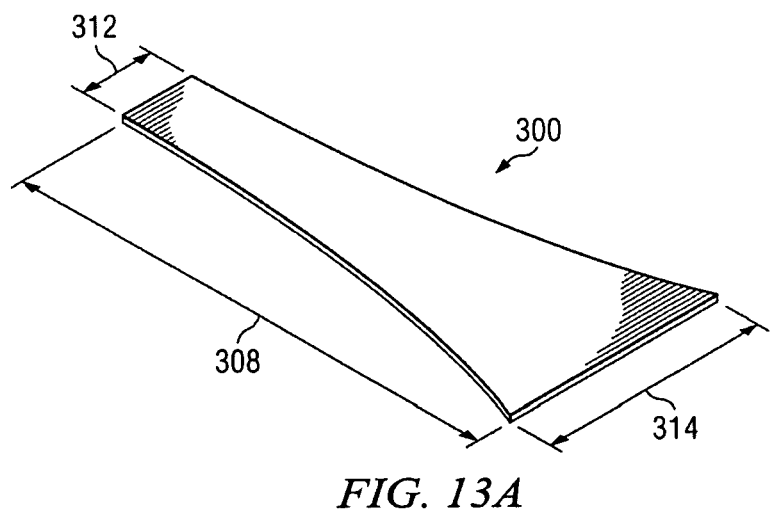
FIG. 13A depicts one embodiment of the vapor shield of the present invention.
Figure 13B:
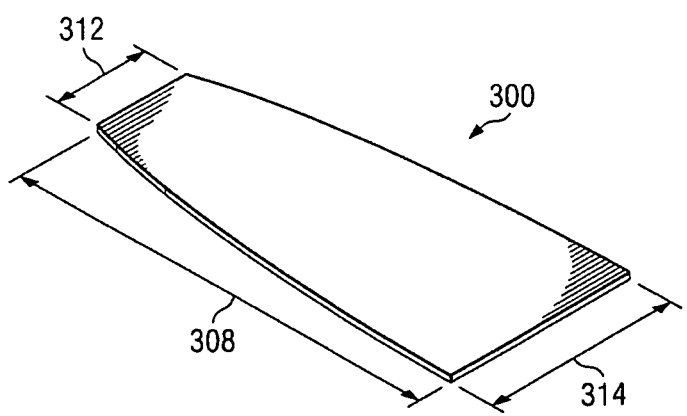
FIG. 13B depicts one embodiment of the vapor shield of the present invention.

FIGS. 13A and 13B depict two variations of another embodiment of the vapor shield of the present invention. This embodiment is a single plate with edges that curve convexly, as in FIG. 13B, or concavely, as in FIG. 13A, within the plate's major plane, along the entire length 308 of the plate. The longest width, or major width 314, of this embodiment is found at one end, while the minor width 312, or shortest width, is found at the opposite end, and the transition between its major and minor widths is convex or concave, respectively. The widths of the transparent, translucent, and opaque film strips created using this embodiment of the vapor shield will again be defined by the major 314 and minor 312 widths of the shield, and the width of the film sheet. However, the curved edges allow a practitioner of the present invention to more finely control the variability of the metallization within the translucent strip because the width of the plate does not vary linearly along its length. Using the convex arrangement depicted in FIG. 13B, the transition from opaque film to transparent film across the width of the translucent strip begins by gradually allowing more visible light through nearer the outer edge of the translucent strip and then accelerates the rate of increase in the degree of transmittance towards the inner edge of the translucent strip. The concave arrangement depicted in FIG. 13A does the opposite; the transition from the opaque film to the transparent film across the width of the translucent strip begins at the outer edge of the translucent strip as a more severe transition and then decelerates the rate of increase in the degree of transmittance towards the inner edge of the translucent strip.

Figure 14:
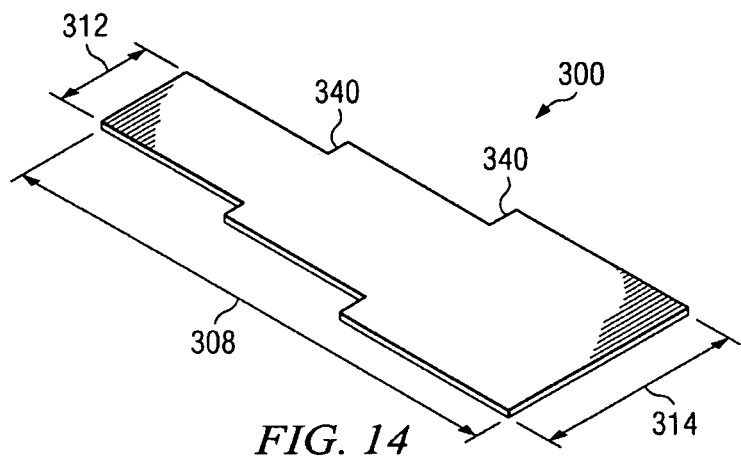
FIG. 14 depicts one embodiment of the vapor shield of the present invention.

FIG. 14 depicts another embodiment of the vapor shield of the present invention. This embodiment of the shield 300 comprises a single plate with a length 308, a major width 314, a minor width 312, and at least one stepped change, or transition, in width 340 between said major width 314 and said minor width 312. The widths of the transparent, translucent, and opaque film strips created using this embodiment of the vapor shield will again be defined by the major and minor widths of the shield, and the width of the film sheet. However, the degree of transmittance in the translucent strip will undergo at least one step change which corresponds to the at least one step change 340 in the width of the shield. This embodiment gives practitioners of the present invention an alternative way of controlling the transition from opaque film to transparent film.

Figure 14A:
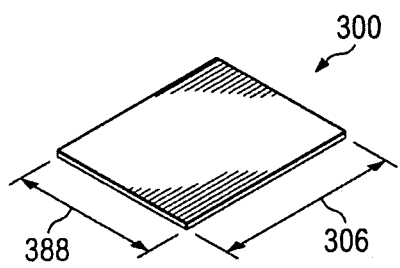
FIG. 14A depicts one embodiment of the vapor shield of the present invention.
Figure 14B:
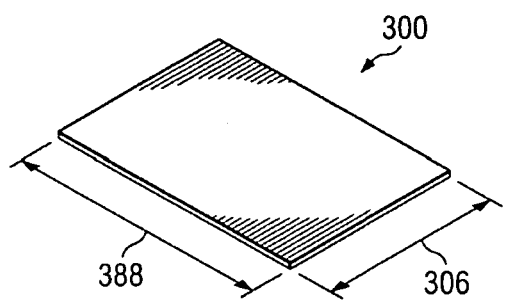
FIG. 14B depicts one embodiment of the vapor shield of the present invention.
Figure 14C:
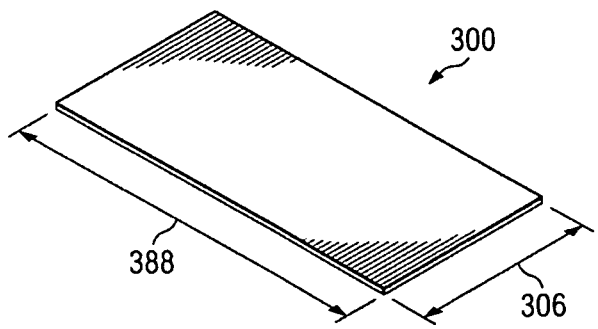
FIG. 14C depicts one embodiment of the vapor shield of the present invention.
Figure 15:
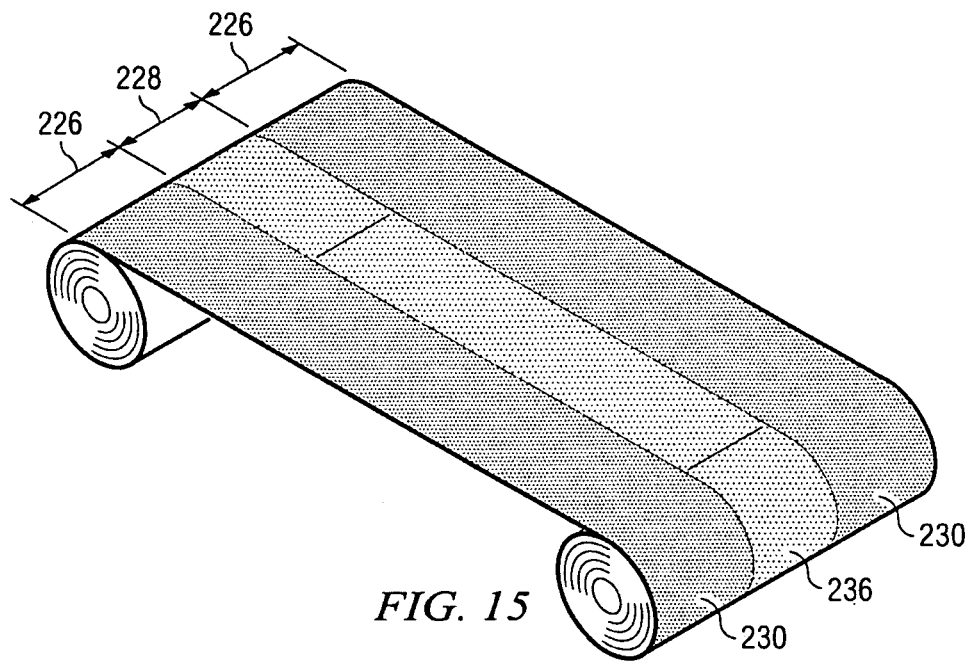
FIG. 15 depicts one embodiment of the partially metallized film of the present invention.

FIGS. 14A through 14C depict other embodiments of the vapor shield of the present invention. Each of these embodiments comprise a single plate with a length 388 and a width 306 that remains constant throughout its length 388. These embodiments, when considered in comparison to each other and FIG. 6, demonstrate that these embodiments of the shield have varying lengths 388 that are shorter than the shield length 308 depicted in FIG. 6. Whereas the length 308 of the shield in FIG. 6 is long enough to completely shield the strip of film below it from receiving any metal during the metallization process (thus making it transparent), the shorter length 388 shields of FIGS. 14A through 14C are short enough allow the area of film underneath to receive some metal during the metallization process, but prevent it from becoming fully metallized, thereby making the strip of film directly underneath the shield translucent. Furthermore, as the length of the shield 388 is shortened in these embodiments, the degree of transmittance for the translucent strip directly underneath the shield will decrease. An example of a sheet of partially metallized film using an embodiment of the shields depicted in FIGS. 14A through 14C is depicted in FIG. 15, and has the following characteristics: (a) one translucent strip 236 with a width 228 equal to the width 306 of the shield; and (b) two opaque strips, each having a width 226 corresponding to the length between an outer edge of the translucent strip 236 and the corresponding edge of the film sheet.

Figure 16:
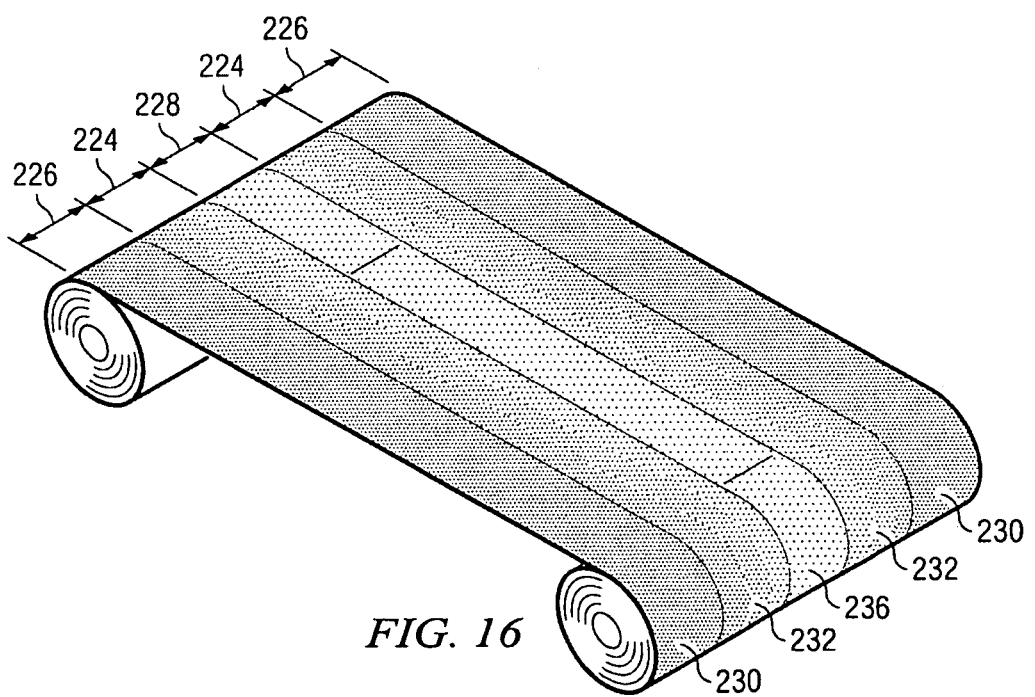
FIG. 16 depicts one embodiment of the partially metallized film of the present invention.

Other embodiments of the present invention are possible by varying the length of the embodiments of the vapor shields depicted in FIGS. 9, 11, 12, 13A and 13B. In a similar manner to that described with reference to FIGS. 14A through 14C above, a shorter length 388 will allow the film strip underneath the shield's minor width to receive some metal during the metallization process, thereby making it translucent. For example, if the length 308 of the embodiment in FIG. 9 is shortened, and its major width 314 is less than the width of the film sheet being metallized, it will produce a film sheet with the following characteristics, as depicted in FIG. 16: (a) one translucent strip 236 having a width 228 approximately equal to the minor width 312 of the shield and having an approximately constant degree of transmittance throughout its width 228; (b) two translucent strips 232, each having a width 224 approximately equal to half the difference between the major 314 and minor 312 widths of the shield 300, and each having a degree of transmittance that varies along its width 224; and (c) two opaque strips 230, each having a width 226 from the outer edge of the translucent strip 232 to the corresponding edge of the film sheet.

Figure 17A:
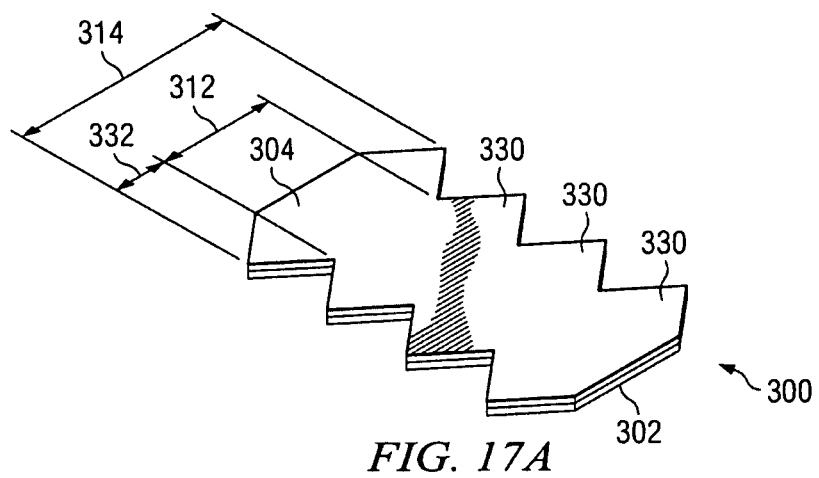
FIG. 17A depicts one embodiment of the vapor shield of the present invention in a first position.
Figure 17B:
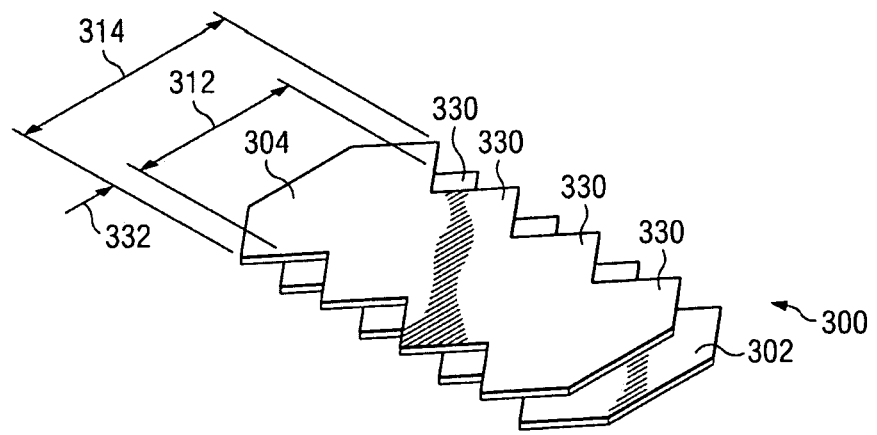
FIG. 17B depicts one embodiment of the vapor shield of the present invention in a second position.

FIGS. 17A and 17B depict still another embodiment of the present invention. This shield in this embodiment comprises two plates 302, 304 each with two faces and an edge, disposed adjacent to one another, face to face. Furthermore, the plates are movably disposed such that one or both plates are able to move in the lengthwise axial direction relative to one another. Each plate is similar to the embodiment of FIG. 11, having saw teeth 330 along its length. In a first position, depicted in FIG. 17A, all of the saw teeth 330 on each plate are fully aligned with one another. When the shield is used in the first position, the width of the translucent strip of film will be approximately equal to the height of the saw teeth 332, and the width of the transparent strip of film will be approximately equal to the minor width 312 of the shield. As described previously, the plates are movably disposed such that one or both plates can be shifted in the direction of the plates' longitudinal axes to a second position. In the second position, depicted in FIG. 17B, none of the saw teeth 330 on either plate are fully aligned with the saw teeth 330 of the other plate. In the second position, the minor width 312 of the shield is increased, and the effective height 332 of the saw teeth is decreased. A sheet of film that is metallized using this embodiment of the shield in the second position will have narrower translucent strips and a wider transparent strip, than a sheet of film metallized using this shield in the first position. In addition, when the shield is used in the second position the translucent strip will have a more rapid change in transmittance across its width. This arrangement gives a practitioner of the present invention the ability to finely tune the properties of the partially metallized film sheet, in that the widths of the transparent strip and the translucent strips can be changed to suit different applications without the need to replace one shield with another.

Figure 18A:
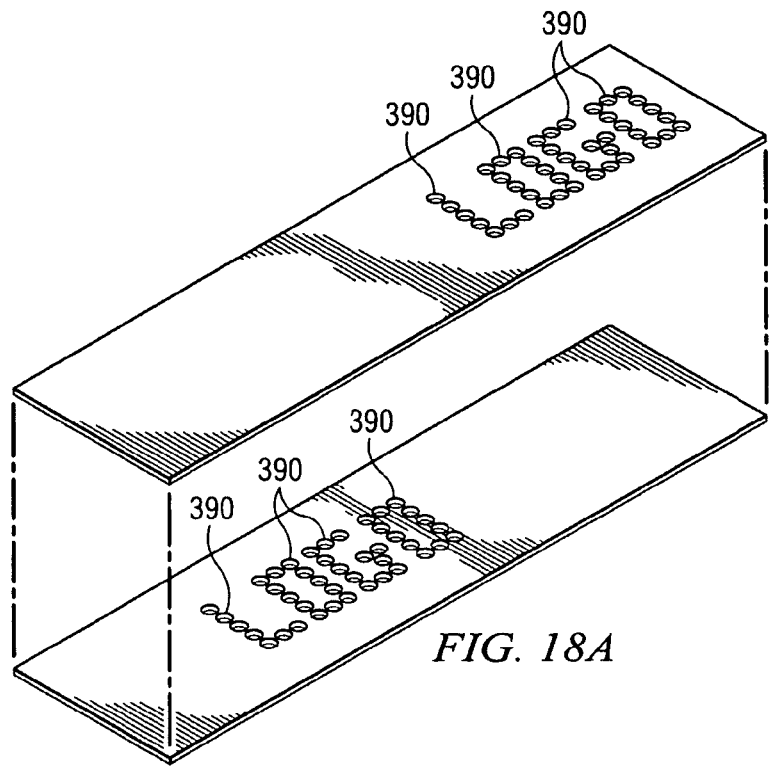
FIG. 18A depicts one embodiment of the vapor shield of the present invention.
Figure 18B:
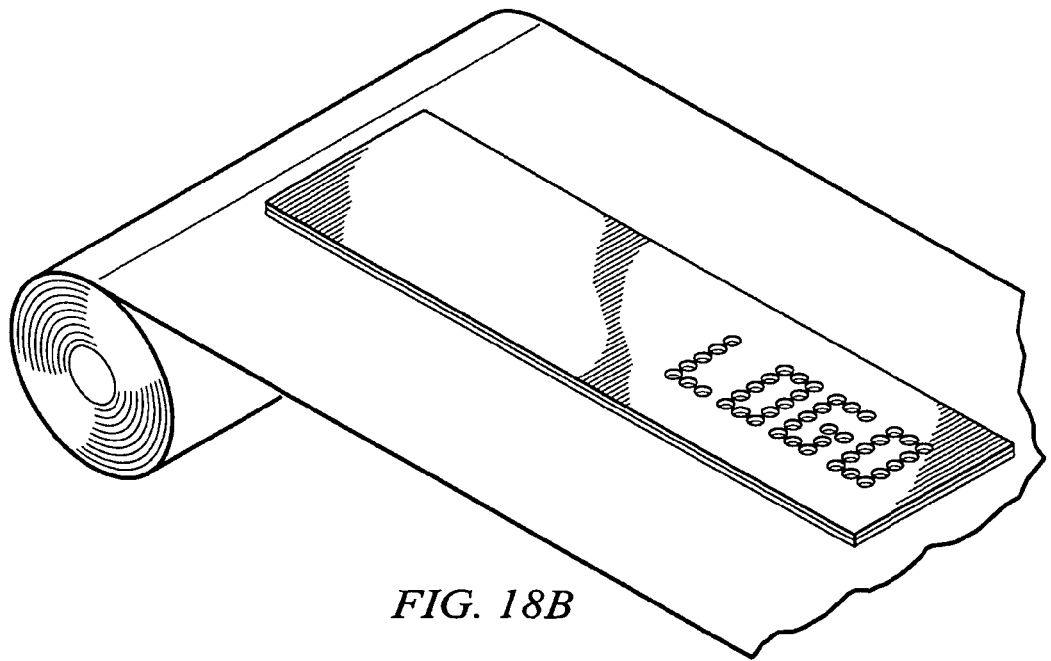
FIG. 18B depicts one embodiment of the vapor shield of the present invention in a first position.
Figure 18C:
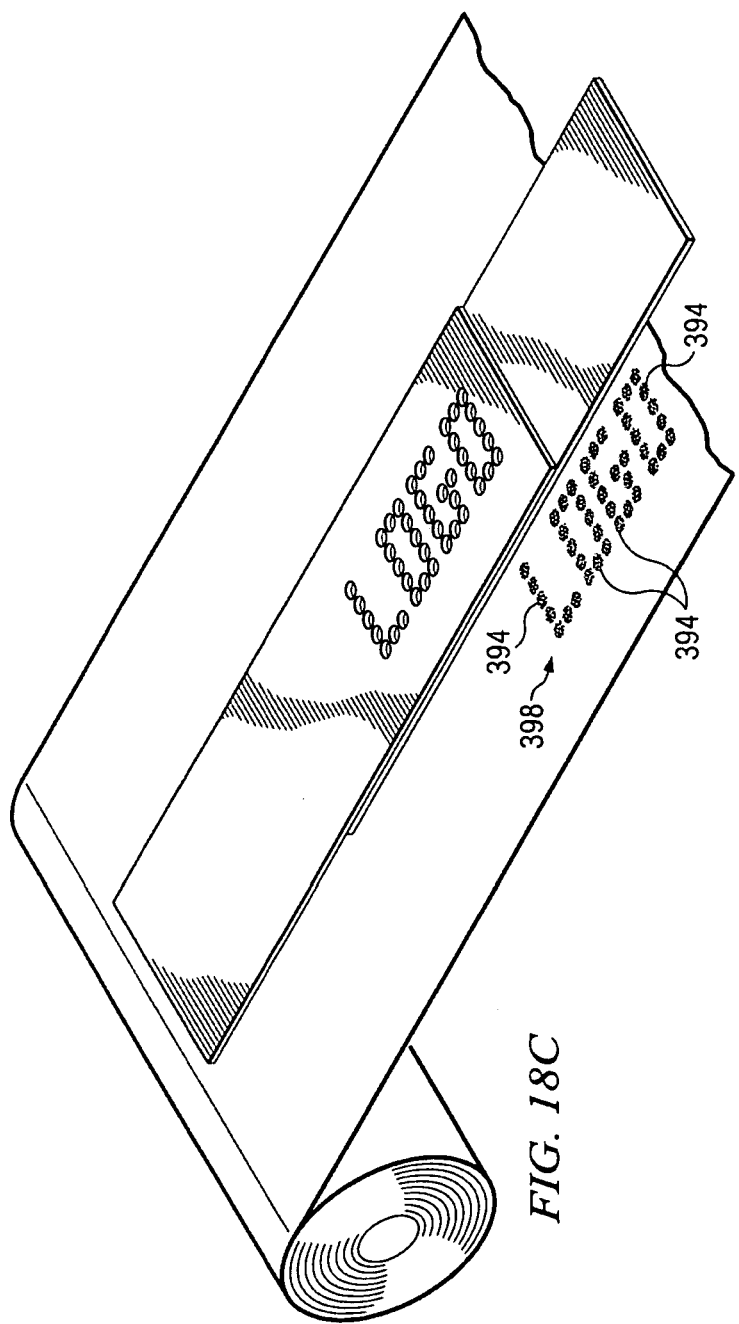
FIG. 18C depicts one embodiment of the vapor shield of the present invention in a second position.

FIGS. 18A, 18B and 18C depict another embodiment of the present invention. This shield in this embodiment comprises two plates, each with two faces and an edge, disposed adjacent to one another, face to face. Furthermore, the plates are movably disposed such that one or both plates are able to move in the lengthwise axial direction relative to one another. Each plate is a solid plate that contains at least one opening 390 comprising at least one target shape 398. The target shape can be, for example, a product logo, as depicted in FIG. 18C, or a graphic design shape. The at least one target shape 398 is the same for both plates. In a first position, depicted in FIG. 18B, the plates are arranged such that the at least one opening 390 in one plate is not aligned with the at least one opening 390 in the bottom plate. Therefore, in the first position, during metallization no vaporized metal 200 passes through the at least one opening 390 and the entire strip of film beneath the shield remains transparent. In a second position, depicted in FIG. 18C, the plates are arranged such that the at least one opening 390 in each plate is aligned with the other. Therefore, in the second position, during metallization vaporized metal 200 is allowed to pass through the at least one opening and mark 394 the film with the target shape 398. During metallization, the plates are periodically shifted from the first position to the second position and rapidly back to the first position. If the plates are left in the second position too long, the target shape 398 will bleed in the direction of the film's travel. In one embodiment, the partially metallized film will have a transparent strip underneath the plates with periodic target shapes 398 marked 394 within the transparent strip. In this embodiment, opaque strips will border the transparent strip. Also note that features of previously discussed embodiments, such as the saw teeth of the FIG. 11 embodiment, or the trapezoid of FIG. 9, can be incorporated into this embodiment to provide a gradual transition from opaque film to transparent film.

Figure 19:
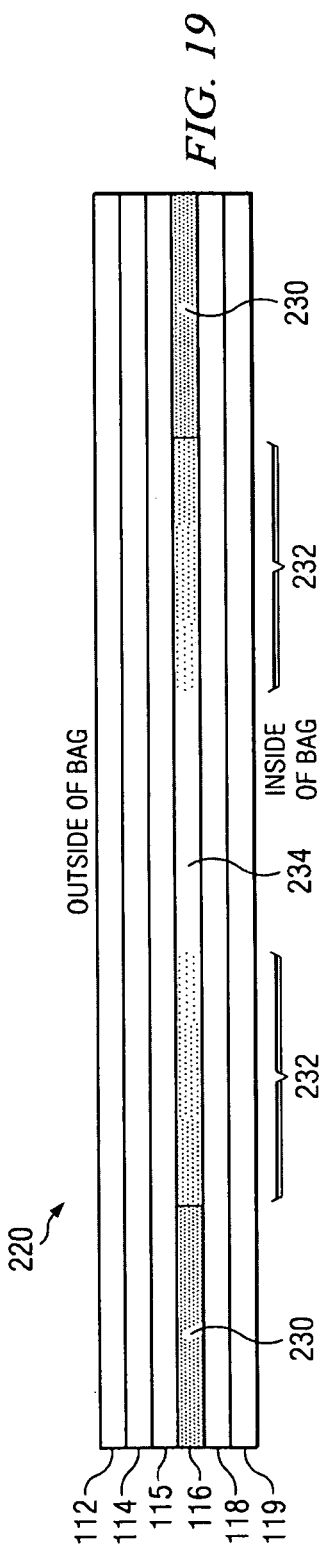
FIG. 19 is a cross sectional view of one embodiment of the packaging film of the present invention.

As stated previously, FIG. 10 depicts one embodiment of a partially metallized film sheet of the present invention with a gradual transition from opaque film to transparent film, which is made using one embodiment of shield of the present invention. This partially metallized film strip can, in turn, be used with the machine depicted in FIG. 3 to create a multi-layered packaging film sheet. FIG. 19 depicts a cross section of one embodiment of a partially metallized, multi-layered packaging film sheet utilizing one embodiment of a shield of the present invention and the laminate machine depicted in FIG. 3. Most of the layers depicted therein are similar to the prior art multi-layered packaging film sheet, except for the metallized layer 116 and the graphics layer 114. (The importance of the graphics layer will be discussed further below.) As can be seen, the thin metal layer 116 is dense nearer to the edges of the film sheet, which corresponds to the opaque strip discussed previously. The dense metal layer then gradually becomes less dense towards the center of the film sheet, which corresponds to the translucent strip discussed previously. The metal layer then disappears altogether near the center of the film sheet, which corresponds to the transparent strip discussed previously.

As discussed previously, the transparent strip runs the entire length of the partially metallized film sheet. If no graphics layer 114 were included in the multi-layered packaging film, the resulting package would have a transparent window that runs longitudinally along the entire length of the product package. A transparent product viewing window can thus be framed by carefully choosing the contents and placement of the graphics layer. As depicted in FIG. 8, the graphics layer can mask the transparent, translucent and opaque strips in a transverse direction across at least one area of the product package, thereby providing a transparent product viewing window in the unmasked area. The transparent product window on the food package is thus defined by at least one longitudinal opaque or translucent strips and at least one transverse graphic strip, or, preferably, two transverse graphic strips and/or product logos. Alternatively, a translucent window can be provided as described previously. Foodstuffs inside the package can then be easily viewed by consumers through the window.

As used herein, the term "package" should be understood to include any container including, but not limited to, any food container made up of multi-layer thin films. The partially metallized film described herein is particularly suitable for forming packages for snack foods such as potato chips, corn chips, tortilla chips and the like. However, while the layers and films discussed herein are contemplated for use in processes for the packaging of snack foods, such as the filling and sealing of bags of snack foods, the layers and films can also be put to use in processes for the packaging of other low moisture products.

Product packages made using partially metallized films, wherein approximately 80% of the area of the film used in the package was metallized, resulted in vastly improved barrier properties over unmetallized films. For example, in one embodiment of a package utilizing such partially metallized film, moisture vapor transmission rates were reduced by about 68% below the MVTR for the same size package created using unmetallized film. In another embodiment of a package utilizing such partially metallized film, the oxygen transmission rate through the package walls was reduced by about 80% below the OTR for the same size package created using unmetallized film. In another embodiment, a package utilizing such partially metallized film and containing 13 ounces of tortilla chips was able to maintain product freshness (less than 2% product moisture, by weight) for more than eight weeks, whereas a package made using unmetallized film kept the product fresh for less than two weeks.

While this invention has been particularly shown and described with reference to a preferred embodiment, it will be understood by those skilled in the art that various changes in form and detail may be made therein without departing from the spirit and scope of the invention.

What is claimed is:

1. A continuous partially metallized packaging film sheet comprising:
   a width running laterally between two outer edges;
   two metallized opaque film strips, wherein each said opaque film strip has an outer edge adjacent to one said outer edge of said packaging film sheet, and has a constant width running between said outer edge and an inner edge;
   two partially metallized translucent film strips, each translucent film strip comprising an outer edge, an inner edge, and a width running between said outer and inner edges, and wherein said outer edge of each said translucent film strip is adjacent to one said inner edge of said opaque film strips, and wherein said translucent film strips are partially metallized by less exposure time to a vaporized metal stream than said opaque film strips, thereby producing said translucent film strips; and
   a non-metallized transparent film strip disposed between said translucent film strips, wherein each said partially metallized translucent film strip provides a gradual transition from each said metallized opaque film strip to said non-metallized transparent film strip.

2. The packaging film sheet of claim 1 wherein each said translucent film strip further comprises a width and a variable degree of transmittance across said width.

3. The packaging film sheet of claim 1 wherein each said translucent film strip further comprises a width and a constant degree of transmittance across said width.

4. The packaging film sheet of claim 2 wherein said degree of transmittance varies approximately linearly across said width.

5. The packaging film sheet of claim 2 wherein said degree of transmittance varies non-linearly across said width.

* * * * *